(12) United States Patent
Wu et al.

(10) Patent No.: US 8,776,474 B2
(45) Date of Patent: Jul. 15, 2014

(54) ANCHORING METHOD FOR EXTERNAL BONDING AND REINFORCING TECHNIQUE WITH PRESTRESSED FIBER CLOTH

(75) Inventors: Zhishen Wu, Nanjing (CN); Kentaro Iwashita, Nanjing (CN)

(73) Assignee: Zhishen Wu & Beijing Texida Technology Co., Ltd., Beijing (CN)

( * ) Notice: Subject to any disclaimer, the term of this patent is extended or adjusted under 35 U.S.C. 154(b) by 213 days.

(21) Appl. No.: 13/513,180

(22) PCT Filed: Dec. 2, 2010

(86) PCT No.: PCT/CN2010/079385
§ 371 (c)(1),
(2), (4) Date: Aug. 7, 2012

(87) PCT Pub. No.: WO2011/066798
PCT Pub. Date: Jun. 9, 2011

(65) Prior Publication Data
US 2012/0311957 A1 Dec. 13, 2012

(30) Foreign Application Priority Data
Dec. 3, 2009 (CN) .......................... 2009 1 0232633

(51) Int. Cl.
| E04B 1/38 | (2006.01) |
| E04C 5/00 | (2006.01) |
| E04C 5/12 | (2006.01) |
| E04C 5/07 | (2006.01) |
| E04C 5/08 | (2006.01) |
| E04G 21/12 | (2006.01) |

(52) U.S. Cl.
CPC . *E04C 5/12* (2013.01); *E04C 5/125* (2013.01); *E04C 5/07* (2013.01); *E04C 5/08* (2013.01); *E04C 5/00* (2013.01); *E04G 21/12* (2013.01)
USPC .......................................................... 52/698

(58) Field of Classification Search
CPC ........... E04G 21/12; E04G 23/02; E04C 5/00; E04C 5/07; E04C 5/08; E04C 5/12; E04C 5/125
USPC .................... 52/698–700, 702, 703, 712–715
See application file for complete search history.

(56) References Cited

U.S. PATENT DOCUMENTS 3,924,103 A * 12/1975 Furuishi et al. ................ 219/528
3,936,661 A * 2/1976 Furuishi et al. ................ 219/528
(Continued)

FOREIGN PATENT DOCUMENTS

| CN | 1415826 A | 5/2003 |
| CN | 1693623 A | 9/2005 |

(Continued)

OTHER PUBLICATIONS

Wu, Zhishen et al., Study on Strengthening Technique with Prestressed PBO Fiber Sheets, Sep. 2005, pp. 18-24, Engineering Science, vol. 7 No. 9; China Academic Journal Electronic Publishing House, http://www.cnki.net.

(Continued)

*Primary Examiner* — Mark Wendell
*Assistant Examiner* — Keith Minter
(74) *Attorney, Agent, or Firm* — Christie, Parker & Hale, LLP

(57) ABSTRACT

An anchoring method for external bonding and reinforcing technique with prestressed fiber cloth mainly involves the following steps: stretching fiber cloth (1) on the surface of a reinforced member (2) firstly, and then bonding the prestressed fiber cloth (1) and the reinforced member (2) as a whole with resin. In addition, certain measures of installing a steel plate (5) for anchoring and using an anchor device (7) are applied to the anchorage end of the prestressed fiber cloth (1) on the end of the reinforced member (2). The prestress on the anchorage end of the prestressed fiber cloth (1) is partly or all released after thermosetting of the resin so as to eliminate or reduce the stress concentration on the end.

10 Claims, 4 Drawing Sheets

(56) References Cited

U.S. PATENT DOCUMENTS

| | | | | |
|---|---|---|---|---|
| 5,043,033 A * | 8/1991 | Fyfe | ................ | 156/71 |
| 5,447,593 A * | 9/1995 | Tanaka et al. | ............. | 156/307.3 |
| 5,648,137 A * | 7/1997 | Blackmore | .................. | 428/102 |
| 5,649,398 A * | 7/1997 | Isley et al. | ................. | 52/309.17 |
| 5,657,595 A * | 8/1997 | Fyfe et al. | ...................... | 52/252 |
| 6,138,420 A * | 10/2000 | Fyfe | ................ | 52/262 |
| 6,557,201 B1 * | 5/2003 | Bowman et al. | ................ | 14/2.4 |
| 6,806,212 B2 * | 10/2004 | Fyfe | ................ | 442/104 |
| 7,615,178 B2 * | 11/2009 | Porter et al. | .................. | 264/257 |
| 7,615,504 B2 * | 11/2009 | Porter et al. | .................. | 442/180 |
| 7,682,993 B2 * | 3/2010 | Derrigan et al. | ............ | 442/136 |
| 8,474,207 B1 * | 7/2013 | Gilbert et al. | ................ | 52/309.1 |
| 8,479,468 B1 * | 7/2013 | Abbasi | ............. | 52/408 |
| 2009/0123770 A1 * | 5/2009 | Melville | ...................... | 428/492 |
| 2012/0260792 A1 * | 10/2012 | Grossman et al. | ........... | 89/36.02 |
| 2013/0074433 A1 * | 3/2013 | Ciuperca | ....................... | 52/426 |
| 2013/0160393 A1 * | 6/2013 | Steinmetz | ...................... | 52/704 |
| 2013/0199715 A1 * | 8/2013 | Fyfe et al. | ..................... | 156/252 |
| 2014/0042751 A1 * | 2/2014 | Fyfe | .............................. | 290/54 |

FOREIGN PATENT DOCUMENTS

| | | |
|---|---|---|
| CN | 1743627 A | 3/2006 |
| CN | 101736912 A | 6/2010 |
| JP | 9-067941 | 3/1997 |
| JP | 2001-146846 | 5/2001 |
| JP | 2004-211290 A | 7/2004 |
| WO | WO 2009/002268 A1 | 12/2008 |

OTHER PUBLICATIONS

International Search Report dated Mar. 10, 2011 issued in PCT/CN2010/079385, 4 pages.

Abstracts for the following references listed above: JP2004211290(A), JP2001146846(A), JP9067941(A), CN1743627A, CN1693623A, CN1415826A, CN101736912A, 4 pages.

* cited by examiner

ANCHORING METHOD FOR EXTERNAL BONDING AND REINFORCING TECHNIQUE WITH PRESTRESSED FIBER CLOTH

CROSS-REFERENCE TO RELATED APPLICATION(S)

This application is a National Phase Patent Application and claims priority to and benefit of International Application Number PCT/CN2010/079385, filed on Dec. 2, 2010, which claims priority to and benefit of Chinese Patent Application Number 200910232633.4, filed on Dec. 3, 2009, the entire disclosure of which are incorporated herein by reference.

FIELD OF THE INVENTION

The present invention relates to an anchoring method, in particular to the application of anchorage in external bonding and reinforcing technique with prestressed FRP sheet, as belongs to structure reinforcement technique in civil traffic engineering.

BACKGROUND OF THE INVENTION

At present, the reinforcement method that bonding a continuous fiber reinforced polymer (FRP) composite material on structural surfaces with a bonding agent (e.g., resin) is widely used as a new and effective structure reinforcement technique for civil traffic building. However, such a passive reinforcement method that merely bonding the continuous FRP composite material to the concrete surfaces has many drawbacks, for example, the bonding strength between FRP and the concrete surface is so limited that bond failure may occur easily; as a result, it is difficult to make full use of the high strength performance of the FRP sheets. In view of those drawbacks, the inventor thinks out an external bonding and reinforcing method with prestress which changes the passive way into an active way, i.e., pre-tension the FRP sheet, and then bond the FRP sheet to the concrete surface with bonding material for bearing force together. Thus, from the point of view of material, the high strength performance of the FRP sheet can be fully utilized; from the point of view of the structure, not only the structural strength is improved, but also the structural rigidity, the rupture strength, and the yield strength are improved effectively. In addition, the end anchoring processing is critical for the technique of external bonding and reinforcing with prestressed FRP sheet and has direct influence on the reinforcement effect of the technique. Up to now, though a lot of research and study on reinforcement structures with externally bonded prestressed FRP sheet have been made in China and foreign countries, the problem of end anchoring has not been solved yet. Owing to the fact that severe stress concentration will occur at the end of FRP sheet after being prestressed, high extra burden will be brought to the end if direct anchoring is used.

DISCLOSURE OF THE INVENTION

Technical Problem

The object of the present invention is to provide an end anchoring technique, to effectively alleviate stress concentration at the ends of the building components.

Technical Solution

The present invention provides an anchoring method for external bonding and reinforcing technique with prestressed fiber cloth, comprising the following steps:

A. making groove on the end of a reinforced component (2), and embedding the upper part of an anchor (7) in the groove;
B. bonding a first layer of fiber cloth (3) to the surface of the reinforced component (2) under the anchor (7);
C. laying a second layer of fiber cloth (1) under the first layer of fiber cloth (3), stressing the fiber cloth (1), and bonding it under the first layer of fiber cloth (3), and then bonding a third layer of fiber cloth (4) under the fiber cloth (1);
D. heating and curing;
E. installing steel plate (5) to form a first anchorage, and releasing partial prestress;
F. installing the lower part of the anchor (7), clamping the first layer of fiber cloth, the prestressed fiber cloth, and the third layer of fiber cloth between the upper part and the lower part of the anchor, heating and curing, and releasing all prestress.

The heating and curing temperature in step D is 80-120° C.
The heating and curing time in step D is 1.5-3 h.
The prestress released in step E is 70~95% of the total stress.

The present invention further provides another anchoring method for external bonding and reinforcing technique with prestressed fiber cloth, comprising the following steps:

A. bonding a first layer of fiber cloth 3 to the surface of reinforced component 2;
B. laying a second layer of fiber cloth 1 under the first layer of fiber cloth 3, stressing the fiber cloth 1, and bonding it under the first layer of fiber cloth 3, and then bonding a third layer of fiber cloth 4 under the fiber cloth 1;
C. heating and curing;
D. installing steel plate 5 to form a first anchorage, and releasing all prestress;
E. installing the upper part of an anchor 7 under the third layer of fiber cloth 4, superposing the first layer of fiber cloth 3, the prestressed fiber cloth 1, and the third layer of fiber cloth 4, and bonding them reversely between the upper part and the lower part of the anchor.

The present invention further provides another anchoring method for external bonding and reinforcing technique with prestressed fiber cloth, comprising the following steps:

A. bonding a first layer of fiber cloth 3 to the surface of reinforced component 2;
B. arranging isolating films 9 at the anchoring location at the end of a three-layer prestressed fiber cloth 6;
C. tensioning the three-layer fiber cloth 6, and bonding it under the first layer of fiber cloth 3;
D. installing a steel plate 5 to form the first anchorage, and releasing partial prestress;
E. arranging the second and the third anchorage by installing steel plates 51 and 52, and releasing all prestress;
F. cutting off the second and the third layer of prestressed fiber cloth of the three-layer prestressed fiber cloth 6 between the steel plate 51 and the steel plate 52, counting from the first layer of fiber cloth 3; tensioning the three-layer fiber cloth 6 again; taking out the steel plate 52; removing the isolating film 9; laying a thickened fiber cloth 10; reinstalling the steel plate 52; heating and curing; releasing all prestress;
G. cutting off the third layer of prestressed fiber cloth of the three-layer prestressed fiber cloth 6 between the steel plate 51 and the steel plate 5, counting from the first layer of fiber cloth 3; taking out the steel plate 51; removing the isolating film 9, laying a thickened fiber cloth 10; reinstalling the steel plate 51; heating and curing.

The prestress released in step D is 40~50% of the total stress.

The tensioning stress in step F is controlled to be (T/3)*0.8 (T is the total tensioning stress on the three-layer FRP cloth).

Beneficial Effects

In the present invention, a FRP sheet is tensioned on the concrete surface, the prestressed FRP sheet is bonded to the concrete with resin, the prestress is released after the resin being heated and cured, and appropriate measures are taken at the anchorage end of the prestressed FRP sheet to partially or entirely release the prestress at the anchorage end of the prestressed FRP sheet, so as to eliminate or reduce stress concentration at the end and thereby alleviate unnecessary burden on the end. In that way, the high tensile performance of the FRP sheet is fully utilized, and the problems related with end anchorage of building element are solved.

BRIEF DESCRIPTION OF THE DRAWINGS

FIG. 1 shows a structural representation of the anchoring method that utilizes an embedded anchor in the present invention and the key points of the construction process;

FIG. 2 shows a structural representation of the anchoring method that utilizes an external anchor and the key points of the construction process;

FIG. 3 is a schematic diagram of tensioning and anchoring method, in which the number of tensioned fiber layers is decreased gradually;

Figure 1A:
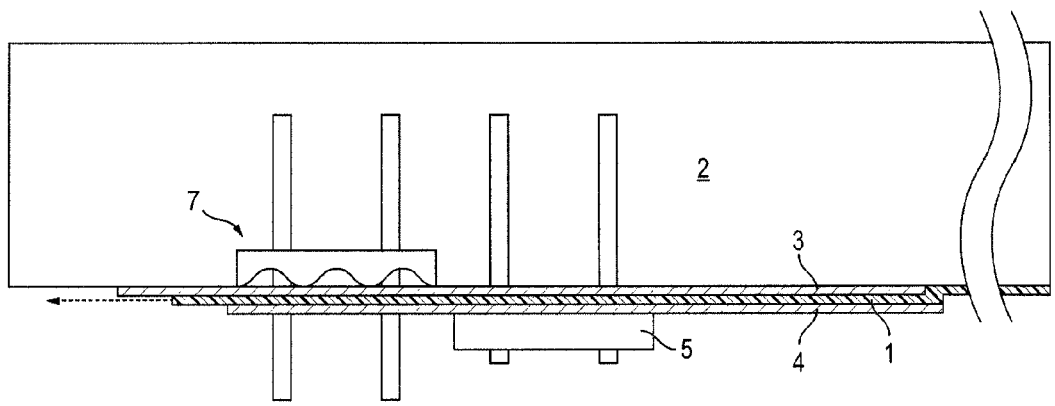
FIG. 1(a) is a structural representation of the prestressed fiber cloth 1 before tensioning.

In the drawings: 1. the prestressed and tensioned fiber cloth; 2. the reinforced component; 3. the first layer of fiber cloth; 4. the third layer of fiber cloth; 5. steel plates 51 and 52.; 6. the multi-layer fiber cloth; 7. the anchor; 9. the isolating film; 10. the thickened cloth; T: total tensioning stress

DETAILED DESCRIPTION OF THE EMBODIMENTS

The technical scheme of the present invention will be further detailed in some embodiments, with reference to the accompanying drawings.

Figure 1B:
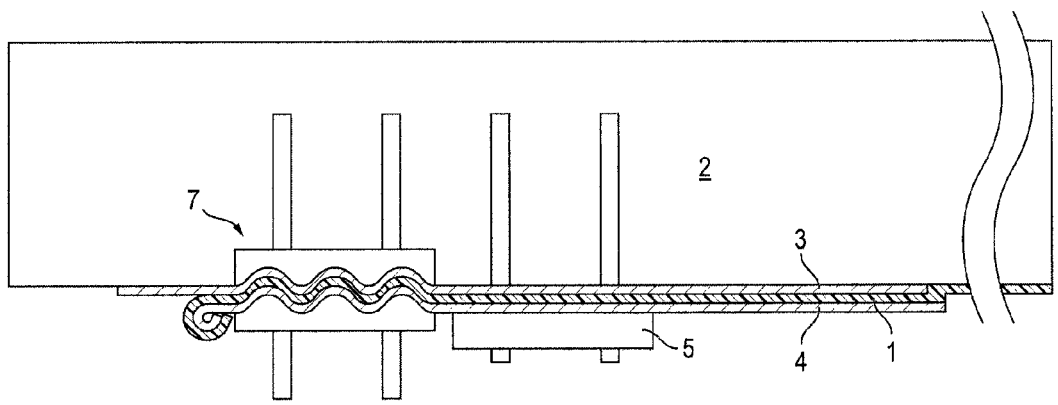
FIG. 1(b) is a structural representation of installation of anchor 7 after the prestressed FRP cloth 1 is tensioned.

FIG. 1 shows the structure of the anchorage for the anchoring method that utilizes an embedded anchor which is the first anchoring measure in the present invention. A prestressed fiber cloth 1 is tensioned at the bottom of the reinforced concrete component 2, and then anchorage is implemented by means of two lines of defense, wherein the first line is the steel plate 5, and with the second line is the anchor 7; each part bear partial prestress.

Implementation steps of the anchoring method with an embedded anchor:

1. Cut out a groove on the end of the reinforced component 2, and embed the upper part of the anchor 7 in the groove;

The anchor 7 comprises two parts: the upper part is embedded into (in direct contacts with) the reinforced component 2, while the lower part clamps the fiber cloth and engages the notches on the upper part to form a whole; the jointing part between upper part and lower part is in a zigzag form. A groove is cut out at the end of the bended component 2 to be reinforced, wherein the width of the groove is enough for installing the anchor 7 at the end, and the depth of the groove is equal to the thickness of the bottom concrete protective layer; holes are drilled to mount bolts, so as to fix the anchor 7.

2. Lay a first layer of fiber cloth 3

A first layer of fiber cloth 3 is laid on the surface of the reinforced component 2 under the anchor 7, which length is 2-3 times of the length of the anchor. The cloth is impregnated with resin and bonded to the surface of the reinforced component 2 within the range from the initiating end of the cloth to the anchor 7.

3. Tension a prestressed fiber cloth 1, and bond a third layer of fiber cloth 4

Lay a prestressed fiber cloth 1 under the first fiber cloth 3 (there is no limitation for the number of layers of prestressed fiber cloth), tension the prestressed fiber cloth 1, and bond the prestressed fiber cloth 1 to the reinforced component 2 with resin within the range of the anchor 7. Lay a third layer of fiber cloth 4 under the prestressed fiber cloth 1, and bond width and range are equal to the cloth mentioned above; then, heat and cure.

4. Bond, install steel plates, and release prestress

Install a steel plate 5 near the anchor 7 in the mid-span direction to form a first anchorage, and the steel plate, the first layer of fiber cloth 3, the prestressed fiber cloth 1, and the third layer of fiber cloth layer 4 are integrated with the concrete structure by anchoring with bolts. Release the partial prestress. The residual prestress is 5%-30% of the designed tensile strength of FRP.

5. Install an anchor and release the prestress

Superpose the first layer of fiber cloth 3, the prestressed fiber cloth 1, and the third layer of fiber cloth 4, impregnate them with resin, and then install the lower part of anchor 7 to form a second anchorage; clamp the first layer of fiber cloth r 3, the prestressed fiber cloth 1, and the third layer of fiber cloth 4 between the upper part and the lower part of the anchor; heat and cure under vacuum condition; release all prestress; roll up the fiber cloth at outer side of the anchor after the anchorage installation.

Figure 2A:
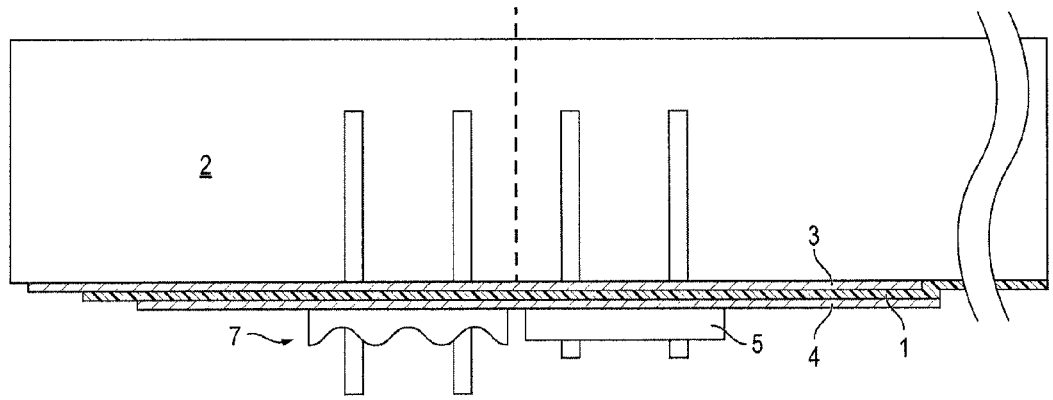
FIG. 2(a) is a structural representation of installation of the upper part of the external anchor 7.
Figure 2B:
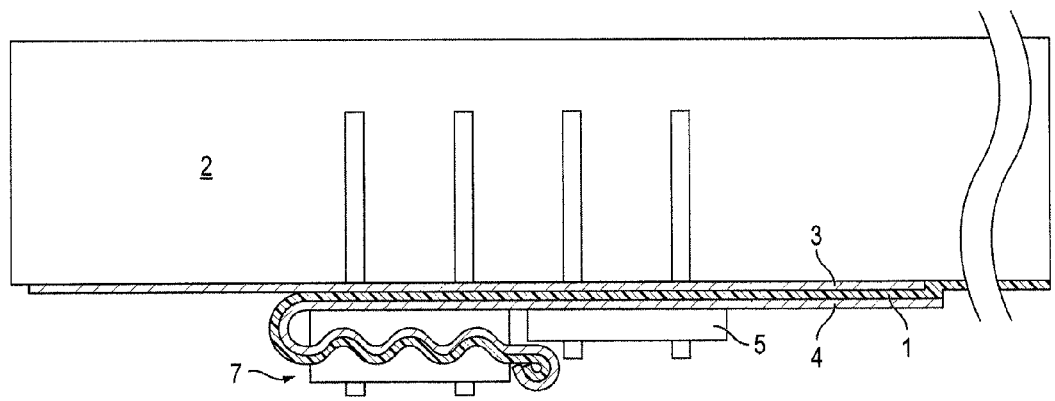
FIG. 2(b) is a structural representation of installation of the lower part of the anchor 7, with all prestress released.
Figure 2C:
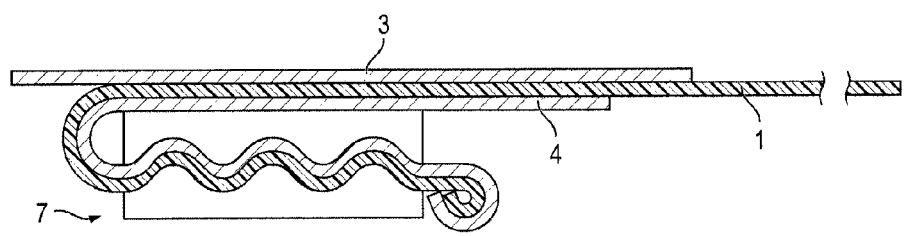
FIG. 2(c) is a partially enlarged view for end reinforcement of the anchor.
Figure 3A:
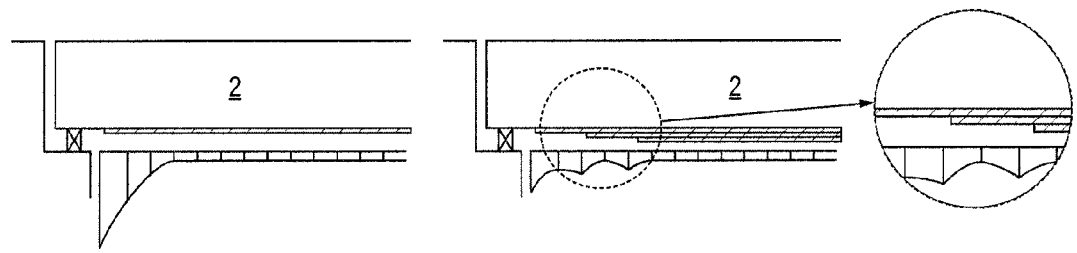
FIG. 3(a) shows the comparison of end stress distribution between layered anchoring method and non-layered anchoring method.
Figure 3B:
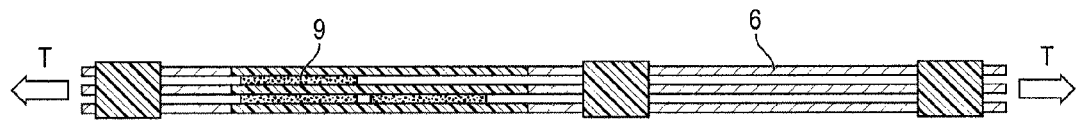
FIG. 3(b) is a structural diagram of the tensioned multi-layer fiber cloth 6.
Figure 3C:
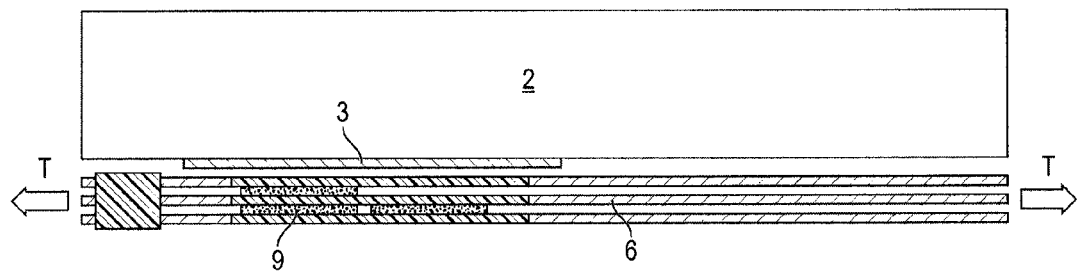
FIG. 3(c) is a detailed structural diagram wherein the first layer of fiber cloth 3 is bonded to the end of the reinforced component 2.
Figure 3D:
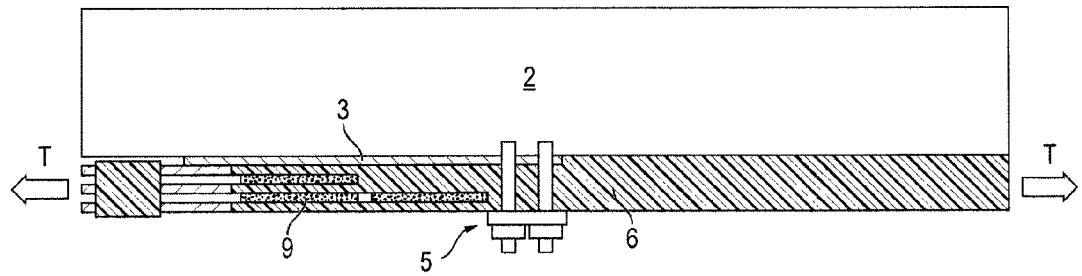
FIG. 3(d) is a structural diagram wherein the multi-layer fiber cloth 6 is bonded and steel plate 5 is anchored.
Figure 3E:
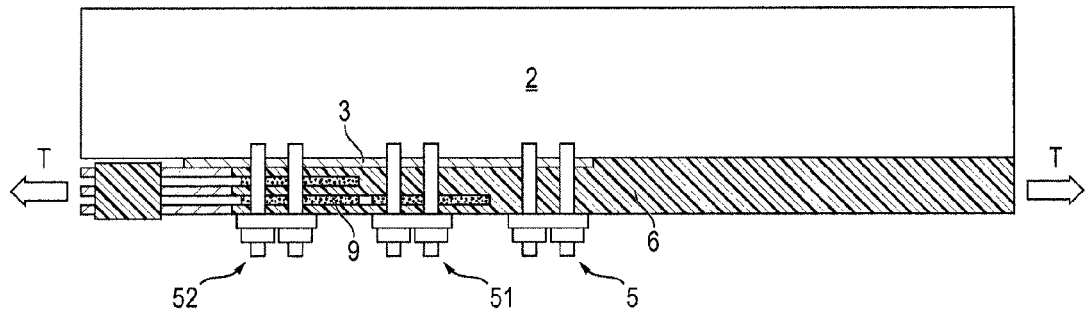
FIG. 3(e) is a structural diagram wherein the steel plates 51 and 52 are anchored.
Figure 3F:
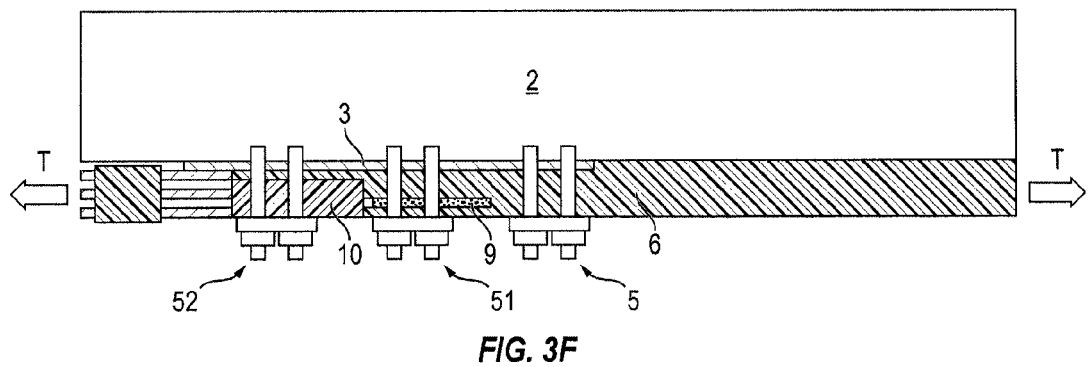
FIG. 3(f) is a structural diagram wherein a thickened cloth 10 is bonded to the bottom of the anchored steel plate 52.
Figure 3G:
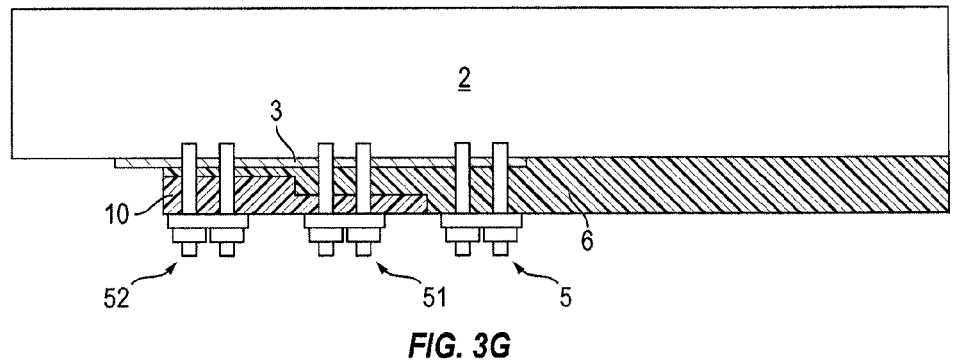
FIG. 3(g) is a final structural diagram of layered anchorage.

FIG. 2 shows the structure of the anchorage for the anchoring method that utilizes an external anchorage, which is the second anchoring measure in the present invention. The anchoring measures in FIG. 1 and FIG. 2 are similar to each other, with essential difference as follows: in FIG. 2, the anchor 7 is installed under the fiber cloth 1, 3, and 4, and doesn't bear prestress; instead, it serves as a safety protection means.

As shown in FIG. 2, the second anchoring measures that utilizes an external anchorage is characterized in that: the upper part of the anchor is arranged under the fiber cloth, and then the fiber cloth is bonded reversely between the upper part and the lower part of the anchor. The construction procedures are as follows:
1. Bond the first layer of fiber cloth 3 to the surface of the reinforced component 2;
2. Lay a second layer of fiber cloth 1 under the first layer of fiber cloth 3, tension the fiber cloth 1, and bond it under the first layer of fiber cloth 3, and then bond a third layer of fiber cloth 4 under the fiber cloth 1;
3. Heat and cure;
4. Install a steel plate 5 to form a first anchorage, and release all prestress;
5. Install an anchor: install the upper part of the anchor under the third layer of fiber cloth 4, superpose the first layer of fiber cloth 3, the prestressed fiber cloth 1, and the third layer of fiber cloth 4, impregnate them with resin and bond them reversely between the upper part and the lower part of the anchor. Heat and cure, and roll up the fiber cloth at the outer side of the anchor.

FIG. 3 shows a structural representation of the third anchoring method in the present invention, in which the number of FRP anchoring layers is decreased gradually. This method is applicable to anchoring of multi-layer prestressed fiber cloth. Tension a prestressed fiber cloth 1 on the bottom of the reinforced concrete component 2, then arrange three steel plates to form three anchorages, and decrease the number of anchorage layers gradually.

As shown in FIG. 3, in the third anchoring measure, the number of tensioned FRP layers is decreased gradually, the construction procedures are as follows:
1. Lay a first layer of fiber cloth 3 at the end of the surface of the reinforced component.
2. Arrange isolating films 9 at the end where the fiber cloth 6 is anchored: to achieve multi anchoring, arrange a piece of isolating film 9 between the first layer and the second layer of the fiber cloth 6 (counting from the concrete) at the end of the fiber cloth 6 where the second steel plate is anchored; arrange a piece of isolating film 9 between the layers where the third steel plate is anchored. The length of the isolating film is the same as the width of the steel plates. Tension the prestressed fiber cloth 6; here, the fiber cloth 6 comprises three layers, the layers are impregnated with resin in a discontinued manner; the FRP cloth 6 is tensioned after being heated and cured.
3. Bond the prestressed fiber cloth 6, arrange a steel plate 5 to form a first anchorage, and release the prestress at this time (the prestress released is preferably 40%~50% of the total pre-tensioning stress).
4. Arrange the second and the third anchorage by installing the steel plates 51 and 52.
   Arrange and fix the steel plates 51 and 52 in sequence on the left of the first steel plate 5 along the end direction. At this moment, the fiber cloth at the bottom of the two steel plates is not impregnated with resin and is not bonded. Release all prestress. Cut off the second and the third layers of the prestressed fiber cloth 6 between the steel plate 51 and the steel plate 52, counting from the first layer of fiber cloth 3.
5. Tension the fiber cloth 6 again, and anchor the steel plates 51 and 52 again.
   Tension the prestressed fiber cloth 6 again and control the stress to be (T/3)*0.8 (T is the total tensioning stress of three layers of fiber). Take out the third steel plate 52, remove the isolating film 9, bond two layers of thickened fiber cloth 10, fix the steel plate 52, heat and cure the resin, and release all prestress. Take out the steel plate 51, remove the isolating film 9, bond a layer of thickened fiber cloth 10, fix the steel plate 51, heat and cure the resin, and thus finish anchoring.

Such an anchoring method that utilize external bonding steel plate and decreases the number of layers gradually in the area near the end can greatly alleviate the stress concentration at the end, as shown in FIG. 3(*a*). Though the present embodiment only adopts three-layer fiber cloth, it can adopt multi-layer fiber cloth without departing from the protected scope of the present invention.

The invention claimed is:

1. An anchoring method for external bonding and reinforcing technique with prestressed fiber cloth, comprising the following steps:
   A. making groove on the end of a reinforced component (2), and embedding the upper part of an anchor (7) in the groove;
   B. bonding a first layer of fiber cloth (3) to the surface of the reinforced component (2) under the anchor (7);
   C. laying a second layer of fiber cloth (1) under the first layer of fiber cloth (3), stressing the fiber cloth (1), and bonding it under the first layer of fiber cloth (3), and then bonding a third layer of fiber cloth (4) under the fiber cloth (1);
   D. heating and curing;
   E. installing steel plate (5) to form a first anchorage, and releasing partial prestress;
   F. installing the lower part of the anchor (7), clamping the first layer of fiber cloth, the prestressed fiber cloth, and the third layer of fiber cloth between the upper part and the lower part of the anchor, heating and curing, and releasing all prestress.

2. The anchoring method according to claim 1, wherein, the heating and curing temperature in step D is 80-120° C.

3. The anchoring method according to claim 2, wherein, the prestress released in step E is 70~95% of the total stress.

4. The anchoring method according to claim 1, wherein, the heating and curing duration in step D is 1.5-3 h.

5. The anchoring method according to claim 4, wherein, the prestress released in step E is 70~95% of the total stress.

6. The anchoring method according to claim 1, wherein, the prestress released in step E is 70~95% of the total stress.

7. An anchoring method for external bonding and reinforcing technique with prestressed fiber cloth, comprising the following steps:
   A. bonding a first layer of fiber cloth (3) to the surface of reinforced component (2);
   B. laying a second layer of fiber cloth (1) under the first layer of fiber cloth (3), stressing the fiber cloth (1), and bonding it under the first layer of fiber cloth (3), and then bonding a third layer of fiber cloth (4) under the fiber cloth 1;
   C. heating and curing;
   D. installing steel plate (5) to form a first anchorage, and releasing all prestress;
   E. installing the upper part of an anchor (7) under the third layer of fiber cloth (4), superposing the first layer of fiber cloth (3), the prestressed fiber cloth (1), and the third layer of fiber cloth (4), and bonding them reversely between the upper part and the lower part of the anchor.

8. An anchoring method for external bonding and reinforcing technique with prestressed fiber cloth, comprising the following steps:
   A. bonding a first layer of fiber cloth (3) to the surface of reinforced component (2);
   B. arranging isolating films (9) at the anchoring location at the end of a three-layer prestressed fiber cloth (6);

C. tensioning the three-layer fiber cloth (6), and bonding it under the first layer of fiber cloth (3);
D. installing a steel plate (5) to form the first anchorage, and releasing partial prestress;
E. arranging the second and the third anchorage by installing steel plates (51) and (52), and releasing all prestress;
F. cutting off the second and the third layer of prestressed fiber cloth of the three-layer prestressed fiber cloth (6) between the steel plate (51) and the steel plate (52), counting from the first layer of fiber cloth (3); tensioning the three-layer fiber cloth (6) again; taking out the steel plate (52); removing the isolating film (9); laying a thickened fiber cloth (10); reinstalling the steel plate (52); heating and curing; releasing all prestress;
G. cutting off the third layer of prestressed fiber cloth of the three-layer prestressed fiber cloth (6) between the steel plate (51) and the steel plate (5), counting from the first layer of fiber cloth (3); taking out the steel plate (51); removing the isolating film (9), laying a thickened fiber cloth (10); reinstalling the steel plate (51); heating and curing.

9. The anchoring method according to claim 8, wherein, the prestress released in step D is 40%~50% of the total stress.

10. The anchoring according to claim 8, wherein, the tensioning stress in step F is controlled to be (T/3)×0.8 (T is the total tensioning stress on the three-layer FRP cloth).

\* \* \* \* \*